US010055912B2

(12) United States Patent
Kisters

(10) Patent No.: US 10,055,912 B2
(45) Date of Patent: Aug. 21, 2018

(54) SECURITY METHOD

(71) Applicant: Friedrich Kisters, Kreuzlingen (CH)

(72) Inventor: Friedrich Kisters, Kreuzlingen (CH)

(*) Notice: Subject to any disclaimer, the term of this patent is extended or adjusted under 35 U.S.C. 154(b) by 0 days.

(21) Appl. No.: 15/129,772

(22) PCT Filed: Mar. 18, 2015

(86) PCT No.: PCT/EP2015/055623
§ 371 (c)(1),
(2) Date: Sep. 27, 2016

(87) PCT Pub. No.: WO2015/144508
PCT Pub. Date: Oct. 1, 2015

(65) Prior Publication Data
US 2017/0132857 A1 May 11, 2017

(30) Foreign Application Priority Data
Mar. 27, 2014 (DE) .................. 10 2014 004 348

(51) Int. Cl.
G06K 5/00 (2006.01)
G07C 9/00 (2006.01)
(Continued)

(52) U.S. Cl.
CPC ......... G07C 9/00015 (2013.01); G06F 21/31 (2013.01); G06F 21/32 (2013.01); G06F 21/44 (2013.01); G07D 7/2033 (2013.01)

(58) Field of Classification Search
CPC ............ G06K 5/00; G06K 7/01; G06K 19/00; G06K 19/06; G06F 17/00
(Continued)

(56) References Cited

U.S. PATENT DOCUMENTS 4,998,279 A 3/1991 Weiss
2011/0309146 A1* 12/2011 Zazzu .................... G06K 19/16
235/440
(Continued)

FOREIGN PATENT DOCUMENTS

DE 103 04 805 A1 8/2004
DE 10 2009 033221 A1 1/2011
(Continued)

OTHER PUBLICATIONS

International Search Report of International Application No. PCT/EP2015/055623 dated Jun. 12, 2015.

Primary Examiner — Edwyn Labaze
(74) Attorney, Agent, or Firm — Roberts Mlotkowski Safran Cole & Calderdon, P.C.

(57) ABSTRACT

The present invention relates to a method for authenticating and/or identifying persons, objects, service systems or computer programs, in which a static, unchanging security feature that is characteristic of the person, the object, the service system or the computer program, is created or used, which is subsequently altered under the influence of an unforeseeable factor and thereby converted into a dynamic security feature. Positive authentication is obtained, when the dynamic security feature has at least been partly changed by a dynamic factor between two query times in comparison with the static security feature stored in the storage medium, wherein the static security feature stored in the storage medium corresponds to the most recently updated, altered dynamic security feature from the last query time. Further, the invention relates to an authentication system, in which dynamic security features originate from a static security feature.

14 Claims, 7 Drawing Sheets

Figure 1:
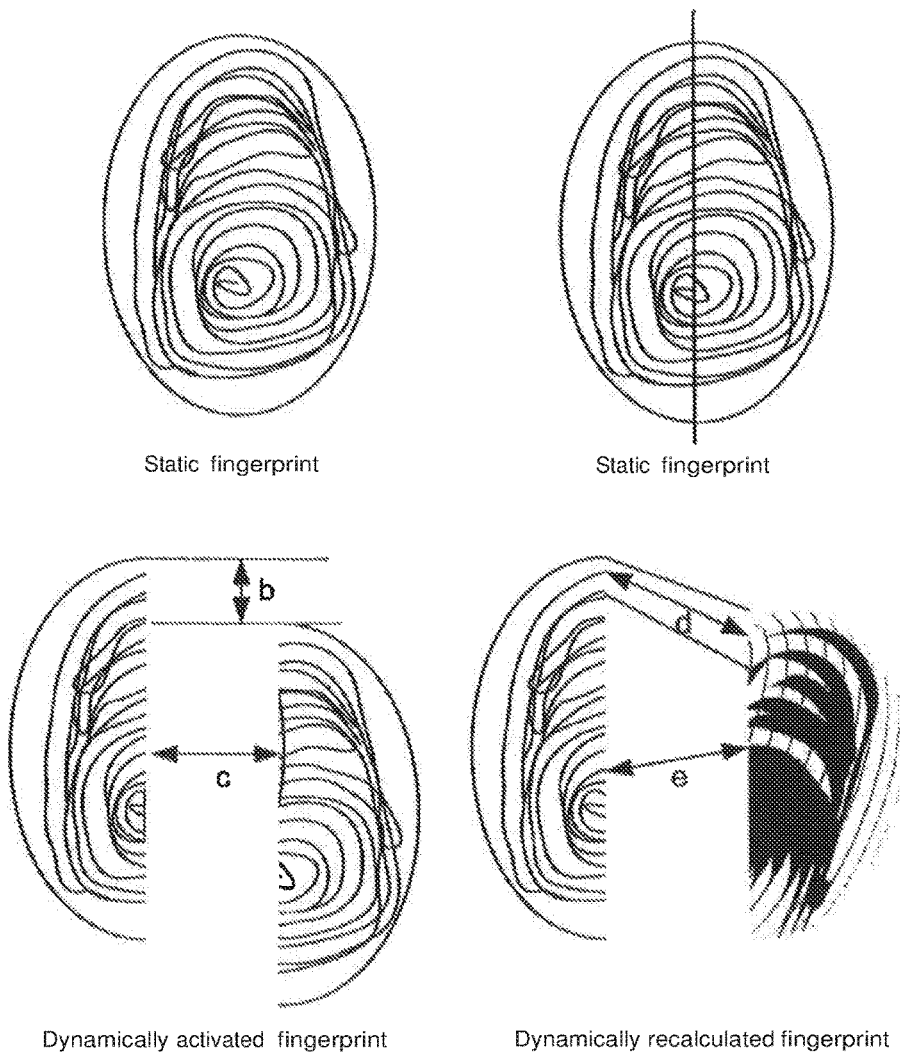

(51) Int. Cl.
*G06F 21/31* (2013.01)
*G06F 21/32* (2013.01)
*G06F 21/44* (2013.01)
*G07D 7/2033* (2016.01)

(58) Field of Classification Search
USPC ..... 235/382, 382.5, 375, 380, 487, 492, 494
See application file for complete search history.

(56) References Cited

U.S. PATENT DOCUMENTS

2012/0175866 A1 7/2012 Kisters
2014/0263624 A1* 9/2014 Guillaud .......... G06K 19/07345
235/380

FOREIGN PATENT DOCUMENTS

| DE | 10 2009 039190 A1 | 3/2011 |
|---|---|---|
| DE | 10 2010 009 977 A1 | 9/2011 |
| DE | 10 2011 055 297 B4 | 5/2013 |
| EP | 0996928 B1 | 6/2004 |
| GB | 2265482 A | 9/1993 |
| WO | 2011/006640 A1 | 1/2011 |
| WO | 2013/191913 A1 | 12/2013 |

* cited by examiner

A

B

C

D

A

B

SECURITY METHOD

TECHNICAL FIELD

The present invention relates to a method and an authentication device for authentication and/or identification of persons, objects, service systems or computer programs, in which a non-changing security feature, which is characteristic for the person, the object, the service system or the computer program, is either newly generated or an existing one is used, which is then changed by the addition of non-determinable factors and thereby changed into a dynamic security feature.

STATE OF THE ART

Many of the known authentication devices are based on rigid security features in which, for example, a PIN number, a biometric feature (e.g., fingerprint), a code or a password is assigned to a specific user. For service systems, access restrictions to specific user groups are the rule and require extensive security measures to protect the related sensitive data of the participants.

Usually, authentication devices are based on a previous registration, in which the identity of a user is stored before the first access of the application by entering user data. In the prior art, different authentication methods are distinguished, wherein the factors include the knowledge (e.g., password), the ownership (e.g., an access card) and personal characteristics of the user (e.g., fingerprint, signature).

Further developments of these technologies foresee, for example, that small portable devices generate valid passwords via an algorithm and an authentication-server at the same time and display it on a display. These passwords contain mostly longer series of numbers that must be entered correctly. Many of these processes can be easily tampered with or bypassed. Password-based authentication systems are extremely safety-prone because data transmissions can be intercepted and thus, hacked.

Methods involving a biometric detection of characteristics of the user, such as a fingerprint or an Iris scan of the user are not always reliable and can fall prey to potential hackers because the biometric data do not change and therefore can be copied.

An example of the transfer of security features in a network system is described in DE 10 2011 055 297 84. In this case, the security features in an autonomous authentication device are separately stored by the application server. A disadvantage of the method, however, is that this is inflexible security features that can be copied.

Another way is pursued in WO 2013/191913 A1, which describes a three-dimensional code having a structure or a profile in X. Y and Z directions. In the structure information is encoded. Here are different parameters of the structures, such as the height, width, or the depth and the shape of the elements are used to encode information. The codes contained therein may also contain more information, for example, conventional codes such as bar codes or QR codes. Again, the structure, even if two-dimensional, is specified and does not change. A change in the structure would inevitably cause a deletion or alteration of the information encoded therein and would be undesirable. So these 3-D structures can be very easily circumvented by a hacker.

DE 10 2010 009 977 A1 describes a security element having aligned magnetic pigments, wherein the action of laser radiation generates a dynamic motif. Thanks to the combination of a static and a dynamic motif, the attention factor and recognition value of the safety element is significantly increased.

Further, safety elements and methods are known, in which surface structures or material structures that form part of a security element, an object or a person, can be utilized. In WO 2011/006640, e.g., topographic structures are used in the form of crackle as a security feature.

EP 0 996 928 81 describes an authentication method, in which a combined code is used, which consists of a unique random part and a non-random part. If required, this code may be encrypted or decoded. The random part of the code can be matched with a local or central database. When querying, e.g., it can be determined whether a code has already been read. However, here the random part and the non-random part of the code (e.g. manufacturer information) are static; the code itself does not change in a dynamic manner.

U.S. Pat. No. 4,998,279 A describes a static code (PIN), which consists of a dynamic variable (e.g. a date or time). However, there is no conversion, recalculation or activation of the static security feature by a dynamic, unpredictable factor.

DESCRIPTION OF THE INVENTION

Against this background, it is an object of the present invention to provide a more flexible and at the same time improved method for authentication and/or identification, which allows for verification of people, objects, service systems or computer programs with a higher degree of security.

This object is solved by a method comprising the features of claim 1. Preferred embodiments are part of the dependent claims.

Said method is based on the basic idea that a static security element is converted into a changing, dynamic security element. A static safety feature designates a security feature that can be assigned to a specific person, an object, a service system or a computer program, and which does not change by itself. However, a dynamic security feature designates a security feature that changes irreversibly by the action of unforeseeable factors, wherein the development cannot be anticipated by a possible attacker or hacker. The static security feature is thus modified so that at least the concerned changed parts cannot be assigned readily to a specific person, an object, a service system or a computer program. The term object is to be understood broadly in the context of the present invention and includes any kind of devices, systems, media, devices and circuits.

In the method according to the present invention, the static security feature is first stored in a storage medium. The storing can be done in analog or digital form on any media, for example, a database server. The static security feature or parts thereof is/are assigned to a particular person, an object, a service system or a computer software. So far the inventive method is not differentiated from this process step of the methods already known in the art. According to the invention, however, it is foreseen that the static safety feature or parts thereof are converted, recalculated or activated, so that the static feature changes to a dynamic security feature. The conversion, recalculation or activating the static security feature takes place via a non-determinable factor, whereby the entire security feature or parts thereof vis-a-vis the original static security feature are changed either reversibly or irreversibly. A dynamic factor denotes a factor or influence that is constantly altered, for example, a physical parameter. Then the changed dynamic security feature or portions thereof is compared with the static security feature stored in the storage medium at a given query time. The query time defines the time at which, for example, an authentication request is sent to an authentication server. This may be, for example, a user query or the intended activation of a service on a service server. The query time preferably defines the start or end of a session, for example, a session in which a user wants to access a certain service of a service system.

The person and/or object and/or the service system and/or the computer software is/are then positively authenticated when the dynamic security feature has been changed vis-a-vis the static security feature stored in the storage medium by a non-determinable factor between two query times, or changed in the event of increased security requirements at least partially. One feature of change here is that it is not reproducible, i.e. the change of the static security feature into a dynamic security feature preferably takes place in a manner that is not bound by any particular rule and thus cannot be hacked. The person and/or the object and/or the service system and/or computer software are/is than authenticated positively, if the dynamic security feature has changed against the static security feature stored in the storage medium, by a preferably dynamic factor between two query times, or in the case of increased security requirements, has at least partially changed. Thanks to the change in the static security feature in a dynamic security feature under the influence of a dynamic factor, it cannot be predicted by a potential hacker as the dynamic security feature has changed or will change in the future.

Preferably, the dynamic factor relates to a material property, the characteristics of a device or a physical or chemical parameter. For example, it can be foreseen that a fingerprint, triggered as biometric feature, is changed by the factor such that the resulting dynamic security feature can no more be assigned to a specific person. The change may, for example, take place such that the fingerprint profile is recalculated, distorted or broken down into several items. A potential attacker can no longer benefit from such adynamic security feature.

According to the invention, it is further provided that not only a transformation takes place, but that the dynamic security feature is continually developed under the influence of a dynamic factor. At query time, the above-mentioned developed dynamic security feature for a successful authentication is compared with the security feature stored in a database and updated. Thus, the static security feature stored in the storage medium always corresponds to the most recently updated security feature. As the change or development of the dynamic security feature is continuous, a potential hacker does not recognise as to which part or state of the relevant security feature was stored last in the storage medium of the database. By this, a far higher level of security can be achieved than it is the case with conventional, rigid security features.

Preferably, the security feature relates to a biometric security feature, preferably a fingerprint, a recorded human voice profile, the iris of an eye, an ear profile, a composition of a body fluid or other biometric identifier, which is unique to a particular person. This feature can be converted, for example, by changing the geometric profile or the structure, the surface or another characteristic in a dynamic security feature, which is evolving continuously depending upon an internal or external factor in a manner that cannot be predicted.

It may be sufficient that only a part of the security feature is developed. Preferred embodiments provide that the security feature is a material, a device, a substance or a composition or a physical or chemical characteristic of a material, of a device, of a substance or a composition in which at least one component has changed dynamically between two query timings. Regarding physical characteristic, for example, it may relate to the colour or intensity of a material. The colour or intensity can be performed by a dynamic factor, for example, by the reaction with atmospheric oxygen. In such an embodiment, the security feature may initially be present in protected form, for example, covered by a safety film. Pulling off the security film, the safety feature is activated, in which a substance reacts with oxygen in the air, making these changes. Preferably, the change takes place over a longer period, so that a dynamic state between a plurality of query times is available.

In a further variant, the security feature can relate to a three-dimensional structure or a three-dimensional code, which has the areas that are changed dynamically by adynamic factor. while other areas remain unchanged in this structure or the code.

It is preferably provided that the change in the static security feature in a dynamic security feature takes place physically, chemically, biologically, mechanically, magnetically or by behaviour and that the change comprises growing, shrinking, a supplement, a shortening, an exchange, a distortion, an equalization, an addition, a removal, a change in a physical value, a conversion or a recalculation of one or more elements or values, their properties or geometries.

Preferably, a manifestation of the changed dynamic security feature is stored with the last successful query time in a central or local storage medium. In the next query, i.e. at the next query time, or in the case of increased security requirements, the stored security feature is compared with a newly submitted safety feature of the person to be authenticated, the object, the service systems or of the computer program. The authentication and/or identification run(s) positive if the altered dynamic security feature and the transmitted security feature differ at least partially. The security feature can be stored in various forms in the storage medium. In a preferred variant, the security feature before, during or after the change can be converted into a code or digital information, and stored as such in a storage medium. For example, a photo or scan of a fingerprint can be converted into digital information. This digital information can, in turn, be distorted, so that a dynamic safety information arises. Characteristic for this is that the change is evolved and that at any time of the query the security information stored in the storage medium is replaced with the newly transmitted security information. The storage medium used can run either centrally. locally or mobile, and can be part of a database.

The unchanged static security features and the changed dynamic security features are stored either directly or indirectly in a central and a local database, wherein the dynamic features are changed in at least one of the databases by a dynamic factor between two query times and at the query time, the dynamic security feature is compared with the stored dynamic security feature of the other database.

In a preferred embodiment, the dynamic security features are not reversible, i.e. irreversible. Based on the dynamic security feature, a potential hacker cannot, therefore, derive any information on a particular person, object, a service system or computer program. In another embodiment, however, it may be provided that the dynamic security information is converted back to the original static security information. Through this "reset", a new starting condition is created. By choosing the reset timing additional security is provided.

Preferably, the static security feature is present in an initial state, in which the security feature does not change, and is then activated by a physical, chemical or mechanical influence in a dynamic security feature. Examples of such effects are shown in the examples.

The invention further relates to an authentication system for retrieving at least one security feature and a central and/or local storage medium, in which at least one security feature is stored, and which consist of static dynamic security features, whereby the static security feature is assigned to a person, an object or a service system. The dynamic security feature emanates from the static security feature and can be varied physically. chemically, biologically, mechanically, magnetically or behaviourally-dependent between two query times.

Preferably, the security feature relates to a material, a device, a substance or a composition or a physical or chemical characteristic of a material, of a device, of a substance or a composition, in which at least one component changes between two query times, whereby the change comprises a growing, a shrinking, an extension, a shortening, an exchange, a distortion, an equalization, an addition, a removal, a change of a physical value, a conversion or recalculation of one or more elements, including their properties and geometries.

Preferably, only the dynamic security feature can be read by the interrogator. For example, it can be foreseen that only a part of the original security feature is converted into a dynamic security feature, for example, it can be provided that a protective lacquer conceals the dynamic security feature. Upon removal of the protective lacquer, the underlying layer is activated and forms dynamic, continuously evolving structures that can be scanned by a release device.

Preferably, only the dynamic security feature and not the rigid security feature is readable by the interrogator, in which the rigid security feature is covered with a protective layer which does not allow scanning by the interrogator.

In one embodiment, it is possible to apply a further, purely digital, locally available dynamic security feature in the recalculation of static or dynamic security feature prior to its submission. Such a digital security feature can be, for example, a changing code based on local conditions. Said method is applicable to all rigid security features, which, according to the invention, can be converted or altered via a dynamic factor into adynamic. continuously changing security feature. What is relevant is that the change is carried out in a way that cannot be anticipated by a potential hacker and in which the product is different compared to the initial state.

Ways of Performing the Invention and Industrial Applicability

The invention is further illustrated in the examples below.

In the embodiment FIG. 1 shows a fingerprint as a conventional rigid safety feature. The individual structure of the fingerprint can be assigned to a specific person, so that the concerned person can be authenticated through a fingerprint scan. The invention is now building on it, and stipulates that the static fingerprint is changed by a local factor in a non-predictable manner.

A first modification provides that the visual appearance of the fingerprint is divided into several elements (for example, in two elements), wherein the two elements are moved into each other. In this case, the distances b and c of the two halves of the security feature are determined by the dynamic factor. For example, the image file can be used depending on the battery condition of a mobile phone, in which the security feature is stored as a local dynamic factor. Depending on the charging condition of the battery, the distances band c of the fingerprint are changed. Due to the change of band/or c, the fingerprint as formerly static security feature changes continuously dynamically and becomes a dynamic security feature.

In a further variant, the fingerprint can also be recalculated due to a locally dynamic factor, for example, in which perspective, three-dimensional changes or distortions are made. These vectors can be provided, which deliberately distort the individual levels of visual appearance. This creates a new profile that no longer has much to do with the original appearance of the fingerprint. In this way, counterfeits can be prevented effectively.

Figure 2:
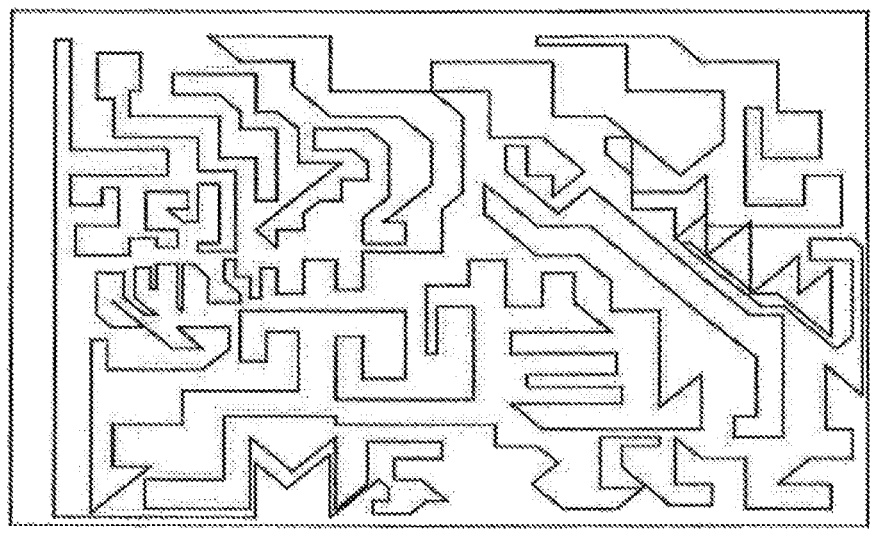
Figure 2:
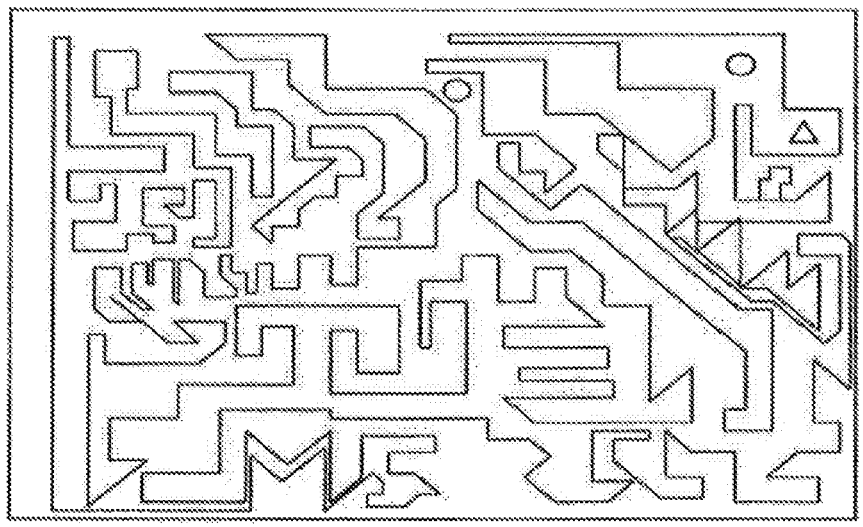
Figure 2:
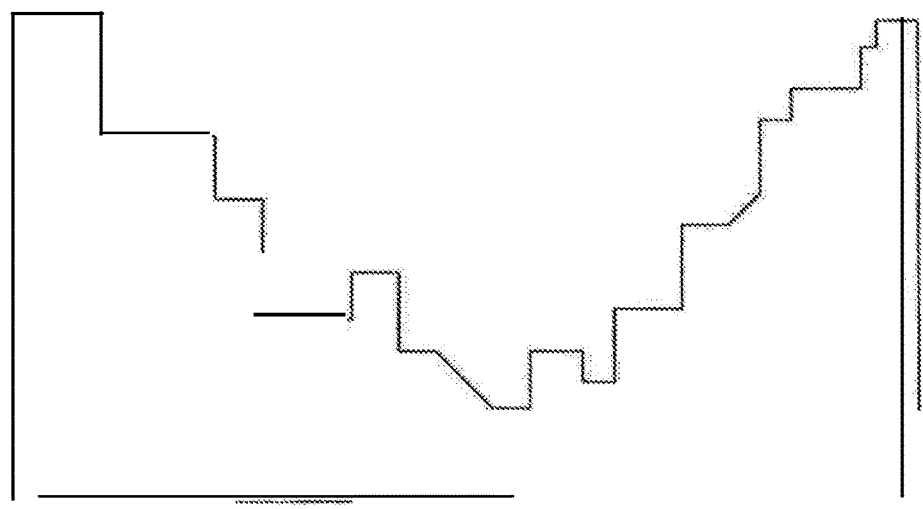
Figure 2:
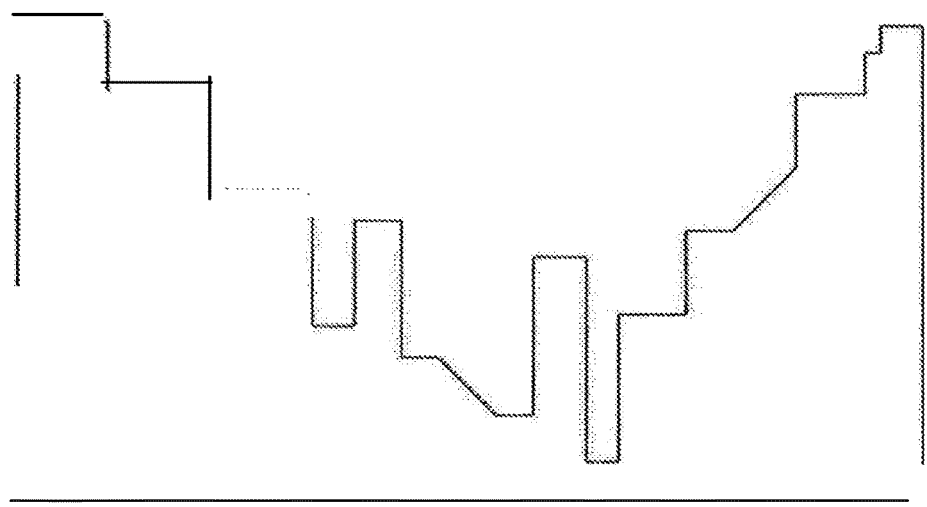

FIG. 2 shows an arbitrary three-dimensional structure, which can, for example, be a three-dimensional 3-D code. The 3-D code may be encoded in an X, Y and Z-directions. Individual positions or spatial elements of the code within a plane can encode in formation. In addition, further information can also be encoded in the depths of the elements.

Known 3-D codes are statically configured, i.e. the profiles and structures do not change, because as a result, the information encoded would be lost or changed. However, if some information is used in the inventive manner as security features, a dynamic change in the sense of the present invention is desired. It can be foreseen that only certain areas within the three-dimensional structure serve as a security feature, which, owing to a dynamic factor, would change as described above by way of example. A potential forger could find indeed, that a change is taking place, but he does not know on which laws or on what factor this change is based. Also, the forger does not know which version of the feature at the time of last query is stored in the storage medium.

The change may be such that the structures at least change in some areas, in which, for example, a shift of a layer or structure profile takes place in X, Y or Z-direction. At the query time, the entire element or at least the security-relevant part would be scanned and transmitted to the authentication device after successful pre-authentication. The authentication device checks whether a change has taken place vis-a-vis the last stored visual appearance. If a change has occurred and the additional features match, then the user is positively authenticated. The transmitted dynamic security feature is then stored as a new security feature in the storage medium and serves as a reference for the next query.

In FIG. 2A, the initial state of a 3-D code is shown, which is present in static form.

In FIG. 28, the structure of the 3-D codes has partly changed. The changes can be seen, for example, in the cross sectional view.

FIG. 2C shows the initial state and FIG. 2D the dynamically altered state.

Figure 3:
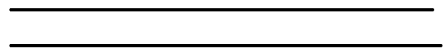
Figure 3:
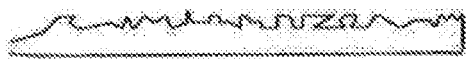

FIG. 3 shows an example of a security element, in which the dynamic condition, starting from an unstructured surface, is generated. The surface can be activated to become adynamic security feature, in which, for example, the surface is coated with a protective lacquer that protects the underlying surface before the change. If the protective lacquer is removed, the underlying surface changes. This change can be effected, for example, by the reaction with atmospheric oxygen. Among the individual query times, the respective level of development of the resulting dynamic pattern is updated in the database.

In FIG. 3A, such a surface is coated with a protective lacquer. After removing the protective lacquer, the surface continues to evolve further, for example, cracks, cavities or grooves are formed in the surface, which evolve continuously. This dynamic state is shown in FIG. 3B. The change in the surface of the safety element can take place either continuously or only when an authentication request is performed. Using a scanner, the surface of the material can be read and stored in a storage medium. At the next query time, the surface has at least partially further developed, so that this current visual appearance of the security element can be stored in the storage medium and can serve as basis for the next authentication.

Figure 4:
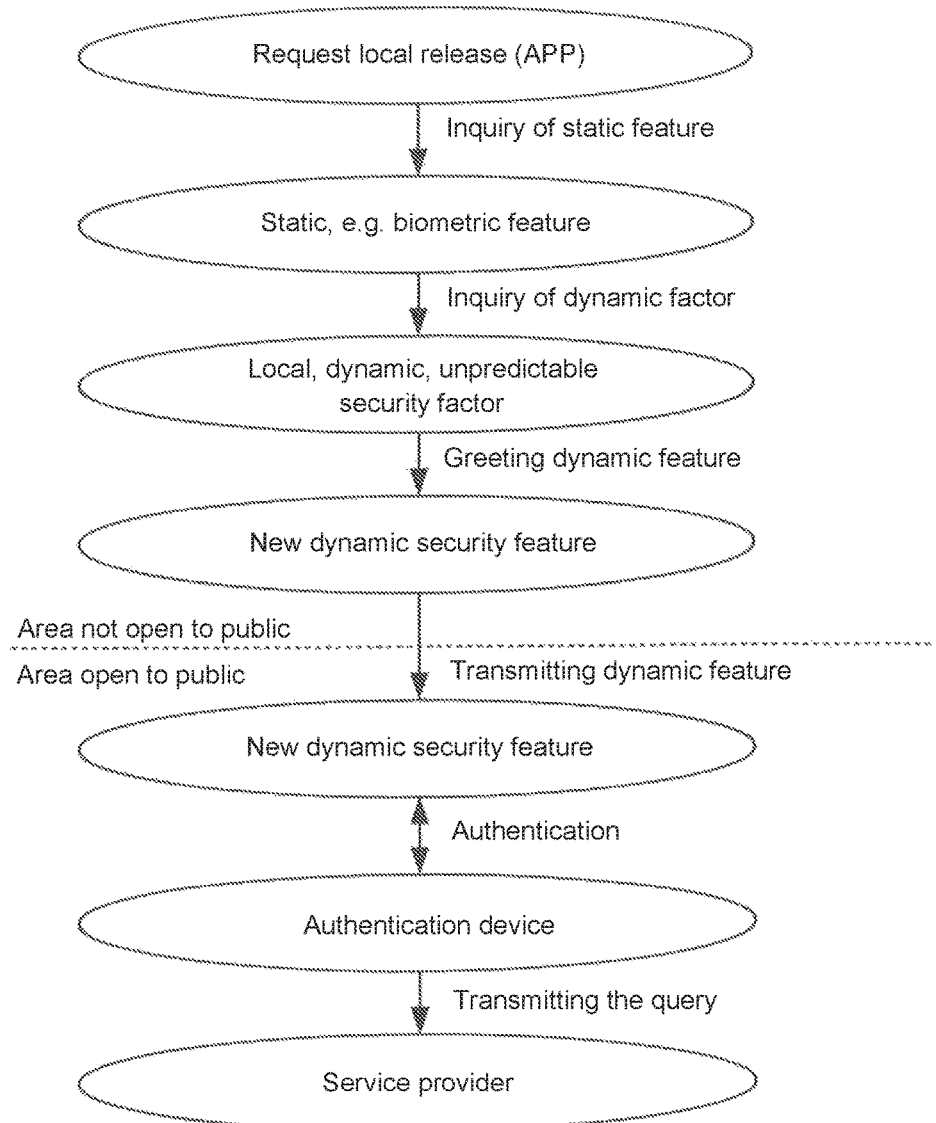

FIG. 4 shows a flow diagram of a variant of the method of the invention. In case of a query, a dynamic characteristic is generated newly from a static feature and by the local dynamic factor. For this purpose, a query is started, which is locally triggered, for example, by software. A static factor is then requested which is, for example, a static, biometric feature. As per the request of a dynamic factor, the static, biometric feature or parts thereof is converted or changed into a local, dynamic, unpredictable security feature. This creates a new dynamic security feature. The new dynamic security feature is transmitted for authentication at an authenticator, which forwards the request to a service provider after a positive authentication.

Figure 5:
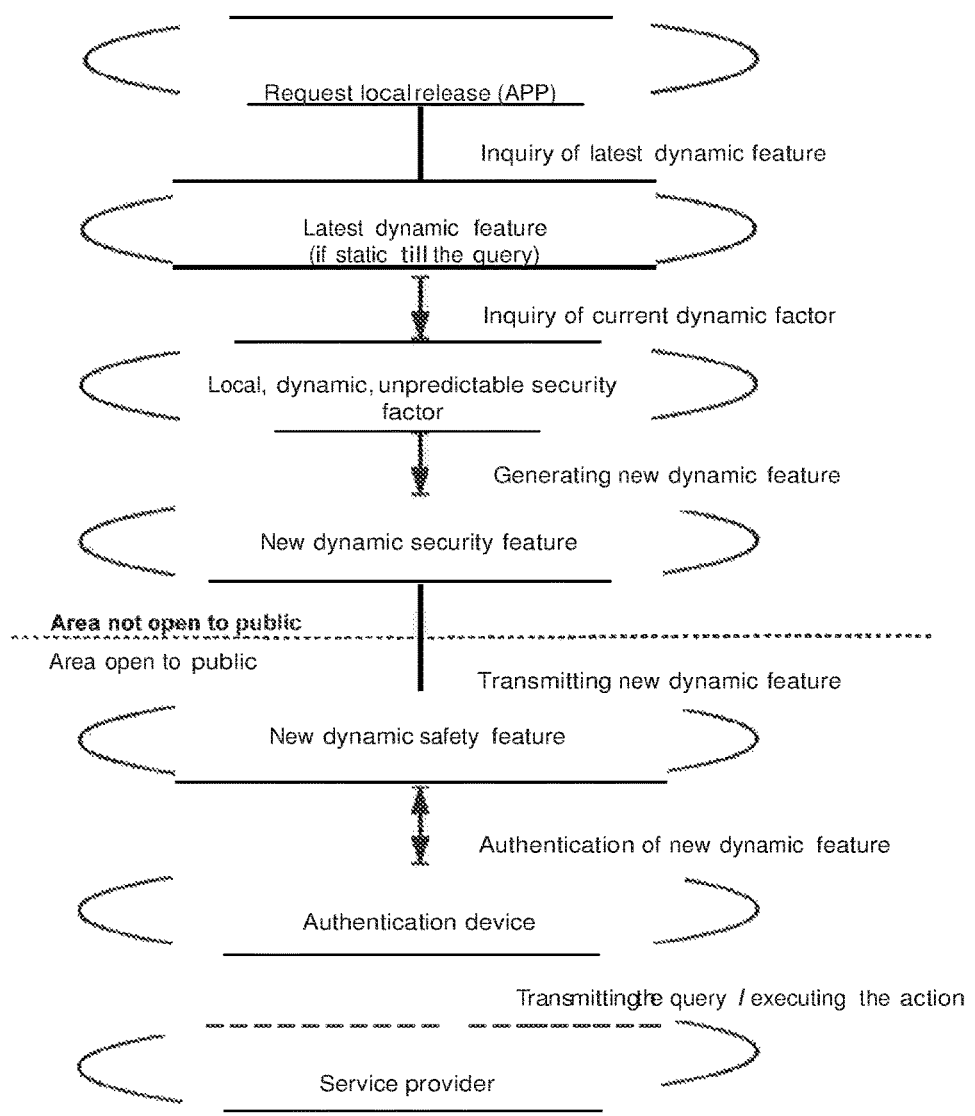

FIG. 5 shows a second variant of the method according to the invention. In this variation, a new dynamic material is generated from the last dynamic material and the local, dynamic factor. Even here, at first a locally triggered request (for example, via a software, app) takes place, whereby the existing dynamic feature is requested. Subsequently, there are requests of the current dynamic factor that changes the last dynamic characteristic, so that a new dynamic security feature arises. In this variation, the dynamic change occurs only with the query, i.e. the security feature does not have to constantly change dynamically. The new dynamic security feature is then transmitted to the authentication device, and with a positive authentication, the release of the service provider takes place.

Figure 6:
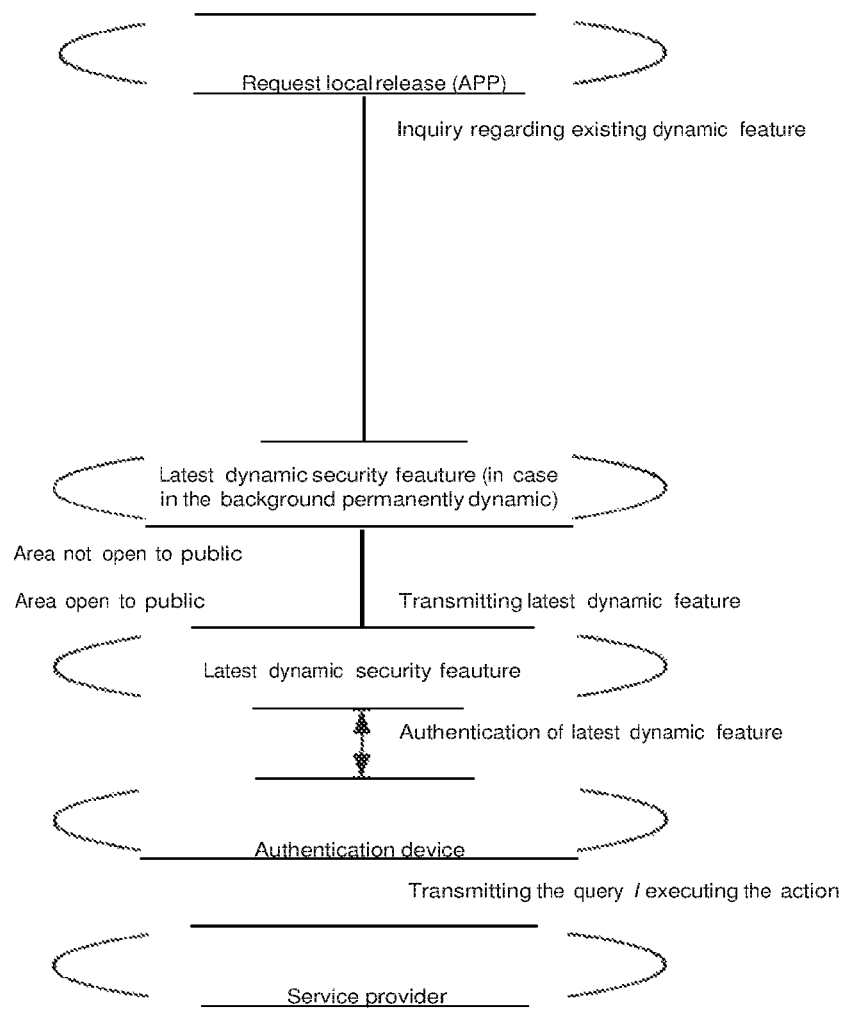

FIG. 6 shows a third variant in which the new dynamic characteristic feature is generated from the last dynamic feature and the local dynamic factor.

Here, the dynamic change of the security feature occurs in the background, independent of the actual request. After triggering the request, the dynamic characteristic is called and the prevailing state of the feature at this time is used as a new dynamic security feature. Unlike the aforementioned variant here, the dynamic change of the security feature takes place permanently in the background, while in the second variant (FIG. 5), the change occurs in the dynamic security feature only when the request is made. This change is triggered preferably by the dynamic factor.

The invention claimed is:

1. A method for authentication and/or identification of persons, objects, service systems or computer programs, comprising the steps:
   a. storing an updated security feature in a central storage medium, wherein the updated security feature comprises stored distorted digital information based upon a static security feature;
   b. assigning at least a portion of the static security feature to one of a specific person, an object, a service system and a computer program;
   c. receiving a dynamic security feature, the dynamic security feature comprising calculated information based upon the application of a dynamic factor to the static security feature factor;
   d. comparing at least a portion of the received dynamic security feature with the updated security feature stored in the central storage medium at a query time;
   e. authenticating as positive when the received dynamic security feature differs at least partially from the updated security feature stored in the central storage medium.

2. The method according to claim 1, wherein the digital information of the updated security feature represents at least one of a material property, a characteristic of a device, a physical parameter and a chemical parameter.

3. The method according to claim 1, wherein the static security feature comprises at least one of a fingerprint, a voice print, an iris of an eye, an ear profile, and a composition of a body fluid.

4. The method according to claim 1, further comprising retaining in the storage medium a copy of a previous security feature.

5. The method according to claim 4, wherein the previous security feature comprises a digital copy of the static security feature.

6. The method according to claim 4, wherein the previous security feature comprises a digital copy of the updated security feature at a time of a pervious query.

7. The method according to claim 1,
   wherein the static security feature comprises a three-dimensional code,
   wherein the calculated digital information is based upon a first portion of the three-dimensional code of the static security feature, and
   wherein the updated security feature further comprise static digital information based upon a second portion of the three-dimensional code.

8. The method according to claim 1, further comprising storing the received dynamic security feature as the updated security in the central storage medium.

9. The method according to claim 1, further comprising storing a digital copy of the static security feature in the central storage medium.

10. The method according to claim 9, further comprising:
    storing the dynamic security feature in a local database; and
    storing the static security feature in central database;
    changing between two query times at least one of the dynamic security feature stored in the local database and the static security feature stored in the central database; and
    comparing at a query time the dynamic security feature stored in the local database with the central security feature stored central database.

11. The method according to claim 1, further comprising replacing the updated security feature stored in the central storage medium with a digital copy of the static security feature.

12. The authentication system according to claim 1,
    wherein the three-dimensional code comprises a plurality of layers, and
    wherein the calculated information comprises a shift of at least one of the plurality of layers by the dynamic factor.

13. An authentication system comprising:
    a dynamic security feature stored on a storage medium, the dynamic security feature comprising:
    information calculated based upon the application of a dynamic factor to a three-dimensional code; and static information based upon the three-dimensional code,
wherein the three-dimensional code is assigned to at least one of a person, an object, a service system and a computer program;
an interrogator capable of receiving the dynamic security feature from the storage medium; and
an authenticator capable of authenticating as positive when the stored received dynamic security feature differs at least partially from a received security feature.

14. The authentication system according to claim 13, wherein the three-dimensional code relates to at least on of a material property, a characteristic of a device, a physical parameter, and a chemical parameter.

\* \* \* \* \*